(12) United States Patent
Ardiff et al.

(10) Patent No.: US 8,256,019 B2
(45) Date of Patent: Sep. 4, 2012

(54) COMPOSITE BALLISTIC FABRIC STRUCTURES FOR HARD ARMOR APPLICATIONS

(75) Inventors: Henry G. Ardiff, Chesterfield, VA (US); David A. Steenkamer, Midlothian, VA (US); Brian D. Arvidson, Chester, VA (US); Danelle F. Powers, Chesterfield, VA (US); Bradley L. Grunden, Midlothian, VA (US); Ashok Bhatnagar, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 1434 days.

(21) Appl. No.: 11/888,479

(22) Filed: Aug. 1, 2007

(65) Prior Publication Data

US 2012/0167751 A1    Jul. 5, 2012

(51) Int. Cl.
*F41H 1/02* (2006.01)
*B32B 27/04* (2006.01)

(52) U.S. Cl. .............. 2/2.5; 442/134; 442/135

(58) Field of Classification Search ....... 2/2.5; 428/911, 428/912; 442/134, 135
See application file for complete search history.

(56) References Cited

U.S. PATENT DOCUMENTS

| | | | |
|---|---|---|---|
| 3,671,542 A | 6/1972 | Kwolek | 524/157 |
| 3,975,487 A | 8/1976 | Cottis et al. | 264/210.6 |
| 4,118,372 A | 10/1978 | Schaefen | 528/190 |
| 4,137,394 A | 1/1979 | Meihuizen et al. | 528/100 |
| 4,161,470 A | 7/1979 | Calundann | 524/599 |
| 4,356,138 A | 10/1982 | Kavesh et al. | 264/164 |
| 4,413,110 A | 11/1983 | Kavesh et al. | 526/348.1 |
| 4,430,383 A | 2/1984 | Smith et al. | 428/364 |
| 4,436,689 A | 3/1984 | Smith et al. | 264/204 |
| 4,440,711 A | 4/1984 | Kwon et al. | 264/185 |
| 4,457,985 A | 7/1984 | Harpell et al. | 428/224 |
| 4,535,027 A | 8/1985 | Kobashi et al. | 428/364 |
| 4,536,536 A | 8/1985 | Kavesh et al. | 524/462 |
| 4,545,950 A | 10/1985 | Motooka et al. | 264/210.6 |
| 4,551,296 A | 11/1985 | Kavesh et al. | 264/203 |
| 4,599,267 A | 7/1986 | Kwon et al. | 428/364 |
| 4,612,148 A | 9/1986 | Motooka et al. | 264/49 |
| 4,617,233 A | 10/1986 | Ohta et al. | 428/364 |
| 4,663,101 A | 5/1987 | Kavesh et al. | 264/178 F |
| 5,032,338 A | 7/1991 | Weedon et al. | 264/203 |
| 5,246,657 A | 9/1993 | Yagi et al. | 264/210.6 |
| 5,286,435 A | 2/1994 | Slukster et al. | 264/205 |
| 5,286,833 A | 2/1994 | Bubeck et al. | 528/183 |
| 5,296,185 A | 3/1994 | Chau et al. | 264/205 |
| 5,342,567 A | 8/1994 | Chen et al. | 264/203 |
| 5,356,584 A | 10/1994 | Bubeck et al. | 264/205 |
| 5,534,205 A | 7/1996 | Faley et al. | 264/103 |
| 5,578,374 A | 11/1996 | Dunbar et al. | 428/364 |
| 5,674,969 A | 10/1997 | Sikkema et al. | 528/183 |
| 5,690,526 A | 11/1997 | Lin et al. | 442/59 |
| 5,702,657 A | 12/1997 | Yoshida et al. | 264/112 |
| 5,736,244 A | 4/1998 | Kavesh et al. | 428/364 |
| 5,741,451 A | 4/1998 | Dunbar et al. | 264/103 |
| 5,918,309 A | 7/1999 | Bachner, Jr. | |
| 5,939,553 A | 8/1999 | Reichwein et al. | 546/250 |
| 5,945,537 A | 8/1999 | Sikkema | 546/307 |
| 5,958,582 A | 9/1999 | Dunbar et al. | 428/364 |
| 5,972,498 A | 10/1999 | Kavesh et al. | 428/364 |
| 6,040,050 A | 3/2000 | Kitagawa et al. | 428/364 |
| 6,040,478 A | 3/2000 | Sikkema et al. | 562/424 |
| 6,448,359 B1 | 9/2002 | Kavesh | 526/352 |
| 6,969,553 B1 | 11/2005 | Tam et al. | 428/364 |
| 2005/0093200 A1 | 5/2005 | Tam et al. | 264/211.14 |
| 2007/0194490 A1 | 8/2007 | Bhatnagar et al. | |

FOREIGN PATENT DOCUMENTS

WO    WO 00/29468    5/2000

*Primary Examiner* — Arti Singh-Pandey

(57) ABSTRACT

A ballistic resistant composite material useful in rigid armor applications. The composite material includes at least one consolidated network of high tenacity fibers in a thermoplastic matrix material. The resin is a thermoplastic polyurethane resin that is semi-crystalline at room temperature. The high tenacity fibers have a tenacity of at least about 7 g/d. Prior to consolidation the polyurethane resin matrix material is in an aqueous medium. When dry, the polyurethane matrix material has a tensile modulus (at 100% elongation) of at least about 500 psi (3.45 MPa), a tensile modulus (at 300% elongation) of at least about 500 psi (3.45 MPa), and an ultimate tensile strength of at least about 2000 psi (13.78 MPa). The ballistic resistant composite material has improved ballistic properties.

31 Claims, No Drawings

COMPOSITE BALLISTIC FABRIC STRUCTURES FOR HARD ARMOR APPLICATIONS

BACKGROUND OF THE INVENTION

1. Field of the Invention

This invention relates to composite materials which are useful for ballistic and other applications, and to their formation.

2. Description of the Related Art

It is known to use thermosetting resins in a fiber composite structure for ballistic resistance. These are typically used in hard or rigid armor applications. However, such resins are typically applied in organic solvents which raise environmental issues for handling and disposal. Also, composites formed from such resins need to be stored in a controlled environment and have a relatively short shelf life prior to formation of the final product.

It is also known to use thermoplastic resins in such composites, including styrene-isoprene-styrene block copolymers and polyurethanes. These materials can be applied from aqueous dispersions which are easier to handle and have fewer environmental issues, including disposal. These types of resins are usually used in flexible armor products.

Especially for rigid or hard armor applications, there is a need to have a composite product which has the requisite stiffness. It would be desirable to provide a rigid armor composite structure which could be applied from an aqueous medium and yet have the desired stiffness level.

SUMMARY OF THE INVENTION

In accordance with this invention, there is provided a ballistic resistant composite material useful in rigid armor applications, the composite material comprising at least one consolidated network of high tenacity fibers in a thermoplastic matrix material, the thermoplastic matrix material comprising a thermoplastic polyurethane resin that is semi-crystalline at room temperature, the high tenacity fibers having a tenacity of at least about 7 g/d, wherein prior to consolidation the matrix material comprises the polyurethane resin in an aqueous medium, the polyurethane matrix material when dry having a tensile modulus (at 100% elongation) of at least about 500 psi (3.45 MPa), a tensile modulus (at 300% elongation) of at least about 500 psi (3.45 MPa), and an ultimate tensile strength of at least about 2000 psi (13.78 MPa).

Also in accordance with this invention, there is provided a preimpregnated element useful in forming rigid armor articles, the preimpregnated element comprising at least two consolidated adjacent layers of a network of high tenacity fibers in a thermoplastic matrix material comprising a thermoplastic polyurethane resin that is semi-crystalline at room temperature, the high tenacity fibers having a tenacity of at least about 7 g/d, wherein prior to consolidation the matrix material comprises the polyurethane resin in an aqueous medium, the polyurethane matrix material when dry having a tensile modulus (at 100% elongation) of at least about 500 psi (3.45 MPa), a tensile modulus (at 300% elongation) of at least about 500 psi (3.45 MPa), and an ultimate tensile strength of at least about 2000 psi (13.78 MPa).

In further accordance with this invention, there is provided a ballistic resistant composite material useful in rigid armor applications, the composite material comprising at least one consolidated network of high tenacity fibers in a thermoplastic matrix material, the thermoplastic matrix material comprising a thermoplastic polyurethane resin that is semi-crystalline at room temperature, the high tenacity fibers comprising high tenacity polyethylene fibers, the network of high tenacity fibers comprising a unidirectionally oriented non-woven fabric, wherein prior to consolidation the matrix material comprises said polyurethane resin in an aqueous medium, the polyurethane matrix material when dry having a tensile modulus (at 100% elongation) of at least about 1000 psi (6.89 MPa), a tensile modulus (at 300% elongation) of at least about 1000 psi (6.89 MPa), an ultimate tensile strength of at least about 4000 psi (27.56 MPa), and a Shore A hardness of at least about 60 when measured after recrystallizing at room temperature for 60 minutes.

Further in accordance with this invention, there is provided a method of forming a ballistic resistant composite material useful in rigid armor applications, the method comprising:

providing at least one network of high tenacity fibers, the high tenacity fibers having a tenacity of at least about 7 g/d;

applying to the network of high tenacity fibers a thermoplastic polyurethane resin matrix material in an aqueous medium, the polyurethane resin matrix material being semi-crystalline at room temperature, the polyurethane matrix material when dry having a tensile modulus (at 100% elongation) of at least about 500 psi (3.45 MPa), a tensile modulus (at 300% elongation) of at least about 500 psi (3.45 MPa), and an ultimate tensile strength of at least about 2000 psi (13.78 MPa); and consolidating the resulting combination of the network of high tenacity fibers and thermoplastic polyurethane matrix resin.

In still further accordance with this invention, there is provided a method of improving the ballistic resistance of a ballistic resistant composite material comprising a consolidated network of high tenacity fibers in a thermoplastic polyurethane matrix material, the high tenacity fibers having a tenacity of at least about 7 g/d, the method comprising:

utilizing as the thermoplastic polyurethane matrix material a thermoplastic polyurethane resin in an aqueous medium, the thermoplastic polyurethane resin matrix material being semi-crystalline at room temperature, the thermoplastic polyurethane matrix material when dry having a tensile modulus (at 100% elongation) of at least about 500 psi (3.45 MPa), a tensile modulus (at 300% elongation) of at least about 500 psi (3.45 MPa), and an ultimate tensile strength of at least about 2000 psi (13.78 MPa).

It has been surprisingly found that improved ballistic properties are achieved in a composite ballistic fabric when using for the matrix material a thermoplastic polyurethane resin that is semi-crystalline, as opposed to an amorphous polyurethane that has been previously suggested. The resulting composite materials and articles made therefrom are especially useful in rigid type ballistic armor applications.

DETAILED DESCRIPTION OF THE INVENTION

For the purposes of the present invention, a fiber is an elongate body the length dimension of which is much greater that the transverse dimensions of width and thickness. Accordingly, the term "fiber" includes monofilament, multifilament, ribbon, strip, staple and other forms of chopped, cut or discontinuous fiber and the like having regular or irregular cross-sections. The term "fiber" includes a plurality of any of the foregoing or a combination thereof. A yarn is a continuous strand comprised of many fibers or filaments. Fibers may also be in the form of split film or tape.

The cross-sections of fibers useful herein may vary widely. They may be circular, flat or oblong in cross-section. They may also be of irregular or regular multi-lobal cross-section having one or more regular or irregular lobes projecting from the linear or longitudinal axis of the fibers. It is preferred that the fibers be of substantially circular, flat or oblong cross-section, most preferably circular.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

Preferably, the high tenacity fibers have tenacities equal to or greater than about 10 g/d, more preferably equal to or greater than about 16 g/d, even more preferably equal to or greater than about 22 g/d, and most preferably equal to or greater than about 28 g/d.

High strength fibers useful in the yarns and fabrics of the invention include highly oriented high molecular weight polyolefin fibers, particularly high modulus (or high tenacity) polyethylene fibers and polypropylene fibers, aramid fibers, polybenzazole fibers such as polybenzoxazole (PBO) and polybenzothiazole (PBT), polyvinyl alcohol fibers, polyacrylonitrile fibers, liquid crystal copolyester fibers, polyamide fibers, polyester fibers, glass fibers, graphite fibers, carbon fibers, basalt or other mineral fibers, rigid rod polymer fibers, and mixtures and blends thereof. Preferred high strength fibers useful in this invention include polyolefin fibers (more preferably high tenacity polyethylene fibers), aramid fibers, polybenzazole fibers, graphite fibers, and mixtures and blends thereof. Most preferred are high tenacity polyethylene fibers and/or aramid fibers.

U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004,699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding about 5 modifying units per 100 main chain carbon atoms, and that may also contain admixed therewith not more than about 50 weight percent of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers (also referred to as extended chain or high molecular weight polyethylene fibers) are preferred and are available, for example, under the trademark SPECTRA® fibers and yarns is from Honeywell International Inc. of Morristown, N.J., U.S.A.

Depending upon the formation technique, the draw ratio and temperatures, and other conditions, a variety of properties can be imparted to these fibers. The tenacity of the polyethylene fibers are at least about 7 g/d, preferably at least about 15 g/d, more preferably at least about 20 g/d, still more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of approximately 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Preferably the polyethylene employed is a polyethylene having fewer than about one methyl group per thousand carbon atoms, more preferably fewer than about 0.5 methyl groups per thousand carbon atoms, and less than about 1 weight percent of other constituents.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

In the case of extended chain polyethylene fibers, preparation and drawing of gel-spun polyethylene fibers are described in various publications, including U.S. Pat. Nos. 4,413,110; 4,430,383; 4,436,689; 4,536,536; 4,545,950; 4,551,296; 4,612,148; 4,617,233; 4,663,101; 5,032,338; 5,246,657; 5,286,435; 5,342,567; 5,578,374; 5,736,244; 5,741,451; 5,958,582; 5,972,498; 6,448,359; 6,969,553 and U.S. patent application publication 2005/0093200, the disclosures of which are expressly incorporated herein by reference to the extent not inconsistent herewith.

In the case of aramid fibers, suitable fibers formed from aromatic polyamides are described, for example, in U.S. Pat. No. 3,671,542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 23 g/d, a modulus of at least about 500 g/d and an energy-to-break of at least about 30 J/g. For example, poly(p-phenylene.terephthalamide) filaments which have moderately high moduli and tenacity values are particularly useful in forming ballistic resistant composites. Examples are Twaron® T2000 from Teijin which has a denier of 1000. Other examples are Kevlar® 29 which has 500 g/d and 22 g/d as values of initial tensile modulus and tenacity, respectively, as well as Kevlar® 129 and KM2 which are available in 400, 640 and 840 deniers from du Pont. Aramid fibers from other manufacturers can also be used in this invention. Copolymers of poly(p-phenylene terephthalamide) may also be used, such as co-poly(p-phenylene terephthalamide 3,4' oxydiphenylene terephthalamide). Also useful in the practice of this invention are poly(m-phenylene isophthalamide) fibers sold by du Pont under the trade name Nomex®.

High molecular weight polyvinyl alcohol (PV-OH) fibers having high tensile modulus are described in U.S. Pat. No. 4,440,711 to Kwon et al., the disclosure of which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/d, a tenacity preferably at least about 10 g/d, more preferably at least about 14 g/d and most preferably at least about 17 g/d, and an energy to break of at least about 8 J/g. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of preferably at least about 10 g/d and an energy to break of at least about 8 J/g. PAN fiber having a molecular weight of at least about 400,000, a tenacity of at least about 15 to 20 g/d and an energy to break of at least about 8 J/g is most useful; and such fibers are disclosed, for example, in U.S. Pat. No. 4,535,027.

Suitable liquid crystal copolyester fibers for the practice of this invention are disclosed, for example, in U.S. Pat. Nos. 3,975,487; 4,118,372 and 4,161,470. Liquid crystal copolyester fibers are available under the designation Vectran® fibers from Kuraray America Inc.

Suitable polybenzazole fibers for the practice of this invention are disclosed, for example, in U.S. Pat. Nos. 5,286,833, 5,296,185, 5,356,584, 5,534,205 and 6,040,050. Polybenzazole fibers are available under the designation Zylon® fibers from Toyobo Co.

Rigid rod fibers are disclosed, for example, in U.S. Pat. Nos. 5,674,969, 5,939,553, 5,945,537 and 6,040,478. Such fibers are available under the designation M5® fibers from Magellan Systems International.

Preferably, the fibers in the network of fibers are selected from the group of high tenacity polyolefin fibers (more preferably high tenacity polyethylene fibers), aramid fibers, PBO fibers, graphite fibers and blends thereof.

The network or networks of fibers used in the composite of this invention may be in the form of woven, knitted, non-woven, braided, paper or other types of fabrics formed from high tenacity fibers. Preferably, at least 50% by weight of the fibers in the fabric are high tenacity fibers, more preferably at least about 75% by weight of the fibers in the fabric are high tenacity fibers, and most preferably all or substantially all of the fibers in the fabric are high tenacity fibers.

The yarns useful in the various fibrous layers of the invention may be of any suitable denier, and may be of the same or different deniers in each layer. For example, the yarns may have a denier of from about 50 to about 3000. The selection is governed by considerations of ballistic effectiveness, other desired properties, and cost. For woven fabrics, finer yarns are more costly to manufacture and to weave, but can produce greater ballistic effectiveness per unit weight. The yarns are preferably from about 200 denier to about 3000 denier. More preferably, the yarns are from about 400 denier to about 2000 denier. Most preferably, the yarns are from about 500 denier to about 1600 denier.

If a woven fabric is employed, it may be of any weave pattern, including plain weave, basket weave, twill, satin, three dimensional woven fabrics, and any of their several variations. Plain and basket weave fabrics are preferred and more preferred are such fabrics having an equal warp and weft count. The fabric may be woven with different fibers or yarns in the warp and weft directions, or in other directions.

With regard to knitted fabrics, these are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The yarns are absolutely straight without the crimp effect found in woven fabrics due to the interlacing effect on the yarns. These laid in yarns can be oriented in a monoaxial, biaxial or multiaxial direction depending on the engineered requirements. It is preferred that the specific knit equipment used in laying in the load bearing yarns is such that the yarns are not pierced through.

A preferred type of non-woven fabric is a unidirectionally oriented fabric. As is known, in such an arrangement the unidirectionally oriented fibers are substantially aligned parallel to one another along a common fiber direction. The unidirectionally oriented fabric may include a minor amount of a material which provides some cross-directional stability to the product; such material may be in the form of fibers, yarns or adhesive yarns all of which are not high tenacity materials, or resins, adhesives, films and the like that may be spaced along the length of the unidirectionally oriented fabric but extend at an angle thereto. Such materials, if present, may comprise up to about 10%, more preferably up to about 5%, by weight of the total weight of the non-woven fabric.

Such unidirectional non-woven fabrics typically are employed in is multiple layers, with the fibers in one layer extending in one direction and the fibers in an adjacent layer extending at an angle with respect to the direction of the fibers in the first layer. For example, successive plies may be rotated relative to one another, for example at angles of 0°/90°, 0°/90°/0°/90°, 0°/45°/90°/45°/0° or at other angles.

The unidirectional non-woven fabrics may be constructed via a variety of methods. Preferably, yarn bundles of the high tenacity filaments are supplied from a creel and led through guides and into a collimating comb. The collimating comb aligns the filaments coplanarly and in a substantially unidirectional fashion. The fibers may then be led into one or more spreader bars which may be included in a coating apparatus, or may be located before or after the coating apparatus.

Another type of non-woven fabric that may be employed herein are such fabrics that are in the form of a felt, such as needle punched felts. A felt is a non-woven network of randomly oriented fibers, preferably at least one of which is a discontinuous fiber, preferably a staple fiber having a length ranging from about 0.25 inch (0.64 cm) to about 10 inches (25 cm). These felts may be formed by several techniques known in the art, such as by carding or fluid laying, melt blowing and spin laying. The network of fibers is consolidated mechanically such as by needle punching, stitch-bonding, hydro-entanglement, air entanglement, spunbond, spun lace or the like, chemically such as with an adhesive, or thermally with a fiber to point bond or a blended fiber with a lower melting point.

With regard to paper fabrics, these may be formed, for example, by pulping a liquid containing the high tenacity fibers.

Preferably, there are employed a plurality of layers of the network of high tenacity fibers. In one example, a two layer composite is formed. In another example, a four layer composite is formed. As is known in the art, multiple layers of such composite or prepreg may be used to form the ballistic-resistant article.

The high tenacity fiber networks of the invention are coated with the matrix resin composition of the invention, as is more fully described below. As used herein, the term "coating" is used in a broad sense to describe a fiber network wherein the individual fibers either have a continuous layer of the matrix composition surrounding the fibers or a discontinuous layer of the matrix composition on the surfaces of the fibers. In the former case, it can be said that the fibers are fully embedded in the matrix composition. The terms coating and impregnating are used interchangeably herein.

The network of fibers may be coated by any desired technique. For example, the matrix resin may be applied by spraying, dipping, roller coating, hot melt coating, or the like. Although it is preferred that the network of fibers is coated with the matrix resin, alternatively or in combination the individual fibers or yarns may be coated with the matrix resin.

In accordance with the invention, the matrix resin used with the network of high tenacity fibers is a thermoplastic polyurethane resin that is semi-crystalline at room temperature, with the polyurethane resin being in an aqueous medium. The resin composition is in an aqueous medium, and may be in the form of an aqueous dispersion, emulsion or solution of the polyurethane resin. It has been found that such resins result in ballistic articles that have improved ballistic properties when compared with amorphous thermoplastic polyurethane resins. The resins used in this invention are crystalline resins, more precisely semi-crystalline resins, as opposed to amorphous resins.

Such semi-crystalline thermoplastic polyurethane resins are in contrast to amorphous polyurethane resins that have been previously proposed. An amorphous thermoplastic polyurethane resin is a resin that has approximately zero crystallinity. The semi-crystalline polyurethane resins have crystallinities of at least about 10%, more preferably at least about 20%, still more preferably at least about 30%, and most preferably at least about 40%. These crystallinities are based on measurements of dried samples of is the polyurethane resin or of thin molded films of the polyurethane resin.

The crystallinity of the thermoplastic resins is preferably determined using x-ray diffraction (XRD) analysis. Other analytical techniques can also be employed, such as differential scanning calorimetry (DSC). The crystallinity measurements by DSC may be somewhat lower than that determined by XRD. The crystallinity of the composite product may be higher or lower than the crystallinity of the polyurethane resin in film form due to the influence of the crystallinity of the other components of the composite, etc.

The thermoplastic polyurethane resins used herein are characterized by certain properties. These properties include the tensile modulus (at 100% elongation), the tensile modulus (at 300% elongation), and the ultimate tensile strength. Additional advantageous properties of these resins include the elongation at break and Shore A hardness.

With regard to the tensile modulus (at 100% elongation), the polyurethane resins useful in the invention have such modulus of at least about 500 psi (3.45 MPa), preferably at least about 1000 psi (6.89 MPa), more preferably at least about 1100 psi (7.58 MPa), and most preferably at least about 1200 psi (8.27 MPa).

Also, with regard to the tensile modulus (at 300% elongation), the polyurethanes used herein have such modulus of at least about 500 psi (3.45 MPa), preferably at least about 1000 psi (6.89 MPa), more preferably at least about 1100 psi (7.58 MPa), and most preferably at least about 1200 psi (8.27 MPa).

The thermoplastic polyurethanes also have an ultimate tensile strength of at least about 2000 psi (13.78 MPa), preferably at least about 4000 psi (27.56 MPa), more preferably at least about 5000 psi (34.45 MPa) and most preferably at least about 5500 psi (37.90 MPa).

Other desirable properties of such crystalline polyurethane resins include an elongation at break of at least 500%, preferably at least about 600%, more preferably at least about 650%, and most preferably at least about 700%.

The polyurethane resins when dry have a relatively high hardness when measured by a Shore A hardness scale. The polyurethane resins preferably have a Shore A hardness of at least about 60, when measured after recrystallizing at room temperature for 60 minutes. More preferably, the Shore A hardness of the polyurethane is at least about 80, when measured after recrystallizing at room temperature for 60 minutes.

To measure such hardness, a film of the polyurethane resin is heated at 80° C. for 60 minutes to decrystallize the film, and the film is then allowed to cool to room temperature for 60 minutes.

The polyurethane compositions used herein may have a range of solids content. For example, the solids content may range from about 20 to about 80 percent by weight, more preferably from about 30 to about 70 percent by weight, and more preferably from about 40 to about 60 percent by weight, with the remaining weight being water. Additives such as fillers, viscosity modifiers and the like may be included in the resin composition.

The proportion of the resin matrix material to fiber in the composite layers may vary widely depending upon the end use. The resin matrix material preferably forms about 1 to about 98 percent by weight, more preferably from about 5 to about 95 percent by weight, and still more preferably from about 5 to about 40 percent by weight, and most preferably from about 10 to about 25 percent by weight, based on the total weight of the composite (fibers and resin matrix).

After coating, the coated fibrous layer may then be passed through an oven for drying in which the coated fiber network layer or layers are subjected to sufficient heat to evaporate the water in the matrix composition. The coated fibrous network may then be placed on a carrier web, which can be a paper or a film substrate, or the fabrics may initially be placed on a carrier web before coating with the matrix resin. The substrate and the resin matrix containing fabric layer or layers can then be wound up into a continuous roll in a known manner.

Following coating of the fabric layer or layers with the resin matrix, the layers are preferably consolidated in a known manner to form a prepreg. By "consolidating" is meant that the matrix material and the fiber network layer are combined into a single unitary layer. Consolidation can occur via drying, cooling, heating, pressure or a combination thereof.

Preferably the composite material of the invention has at least two layers of the consolidated network of fibers which may be considered a pair of layers, such as a cross-plied two layer construction. A plurality of such layers may form the ballistic resistant composite material. In another embodiment, four layers of consolidated networks of fibers are employed, such as four layers that are alternately cross-plied. The total number of layers of the consolidated network of fibers may vary widely, depending on the type of article to be produced, the desired performance and the desired weight. For example, the number of layers may range from about 2 to about 500 layers, more preferably from about 4 to about 200 layers, and most preferably from about 10 to about 60 layers. The layers may be of any suitable thickness. For example, each layer of a section of the plurality of fibrous layers may have a thickness of from about 1 mil to about 40 mils (25 to 1016 µm), more preferably from about 1 to about 30 mils (25 to 762 µm), and most preferably from about 2 to about 20 mils (51 to 508 µm).

Preferably, the fiber layers of the article are formed from the same chemical type of fibers, although it is possible to include fiber networks of a blend of two or more fibers, as well as fiber networks of different types of fibers. For example, the fibers in one layer of a cross-ply structure may be formed of one type of fiber, for example high tenacity polyethylene fibers, and the fibers in an adjacent layer may be formed from a different chemical type of is fiber, for example an aramid fiber.

It is also preferred that the composite ballistic fabric structures do not have any plastic films attached to their surfaces. Also, it is preferred that the ballistic resistant composite material consists essentially of, or consists of, at least one consolidated network of high tenacity fibers in the predominately crystalline thermoplastic polyurethane resin as described above.

It is noted that U.S. Pat. No. 5,690,526 suggests a composite structure formed from a thermoplastic polyurethane in aqueous form; the polyurethane is described by its manufacturer as an amorphous material. Also, WO 00/29468 discloses using a polyurethane that is said to be more amorphous than that of the aforementioned U.S. Pat. No. 5,690,526, and is said to improve the backface deformation of products formed therefrom.

The polyurethane resin disclosed in the aforementioned U.S. Pat. No. 5,690,526 is described as having a tensile modulus (at 100% elongation) of about 190 to 250 psi (1311 to 1725 kPa) and a tensile modulus (at 300% elongation) of about 375 to 450 psi (2587 to 3105 kPa). The specific resin disclosed in U.S. Pat. No. 5,690,526 (Dispercoll U-42) is described by its manufacturer as having an ultimate tensile strength of 530 psi (3.66 MPa). It can be seen that the values for the tensile modulus and the ultimate tensile strength for the resin disclosed in U.S. Pat. No. 5,690,526 are considerably lower than that of the resins employed in the present invention. In addition, the Dispercoll U-42 is described by its manufacturer as having a Shore A hardness about 39, when measured after recrystallizing at room temperature for 60 minutes. This is also considerably below the hardness values of the resins employed herein. It is also noted that the elongation to break of the resins disclosed in the aforementioned U.S. Pat. No. 5,690,526 are at least about 650 to about 1000%.

It has been surprisingly found that enhanced ballistic properties are achieved when using a thermoplastic polyurethane that is predominantly crystalline, as opposed to an amorphous polyurethane suggested by the above-mentioned publications.

Copending, commonly assigned U.S. patent application Ser. No. 11/213,253 filed Aug. 26, 2005 discloses flexible ballistic resistant composites that are resistant to liquid pick-up and employ a thermoplastic polyurethane as the resin matrix, but the predominately crystalline polyurethane resins used in the present invention are not disclosed in such application.

PCT published application WO 2000/29468 discloses polyurethane composites in which an amorphous polyurethane is used.

The composite fabrics of this invention can be used in a wide variety of ballistic resistant applications, such as vehicle panels, breast plates (with or without ceramic facing), military and law enforcement helmets, riot and hand shields, movable ballistic walls and partitions, brief cases, spall liners, and the like. The composite fabrics are especially useful in vehicle protection plates (land, naval and/or air vehicles).

The following non-limiting examples are presented to provide a more complete understanding of the invention. The specific techniques, conditions, materials, proportions and reported data set forth to illustrate the principles of the invention are exemplary and should not be construed as limiting the scope of the invention.

EXAMPLES

Example 1 (Comparative)

A four-ply non-woven composite was formed from layers of unidirectionally oriented 1300 denier high tenacity polyethylene yarns (Spectra® 1000 from Honeywell International Inc.). Unitapes were prepared by passing the fibers from a creel and through a combing station to form a unidirectional network. The fiber network was then placed on a carrier web and the fibers were coated with a styrene-isoprene-styrene block copolymer matrix resin (Prinlin® B7137HV from Henkel Corp.).

The coated fiber network was then passed through an oven to evaporate the water in the composition and was wound up on a roller, with the carrier web stripped therefrom. The resulting structure contained about 16 weight percent of the matrix resin, based on the total weight of the composite. Four continuous rolls of unidirectional fiber prepregs were prepared in this manner, and four unitapes were cross-plied so as to form a 0°/90°/0° 190° consolidated roll. Panels of this material measuring 12×12 inches (30.5×30.5 cm) were used to form a composite structure.

A total of 68 layers of this 4-ply product was placed into a matched die mold of a hydraulic press and molded at 240° F. (115.6° C.) at a molding pressure of 500 psi (3.43 MPa) for a period of 20 minutes. The laminate that was formed had a substantially flat configuration. After molding, the laminate was allowed to cool to room temperature.

The panel was tested for ballistic properties using an M80 ball (7.62×51 mm). The panels had a weight of 3.5 pounds per square foot (17.2 kg/m$^2$) and were tested on a 5 inch (12.7 cm) thick Plastilina #1 clay. Testing was done in accordance with MIL-STD 662 E. The results are shown in Table 1, below.

Example 2 (Comparative)

In this example, ballistic properties were conducted on the same type of fibers as in Example 1, but the fibers were coated with a resin as described in Example 1 of the aforementioned U.S. patent application Ser. No. 11/213,253. The matrix resin was a thermoplastic polyurethane resin described by its manufacturer as being a copolymer mix of polyurethane resins in water (40-60% resin), having a relative density of 1.05 g/cc at 23° C. and a viscosity of 40 cps at 23° C. When dry, the matrix resin comprised about 16 percent by weight of the composite.

Panels of this material were also tested for their ballistic performance using the same type of projectiles as in Example 1. The results are also indicated in Table 1, below.

Example 3

Example 1 was repeated except that the matrix resin was a semi-crystalline thermoplastic polyurethane resin (Dispercoll® U 53 from Bayer) in an aqueous dispersion. When dry, the polyurethane resin has the following properties: a tensile modulus (at 100% elongation) of 1230 psi (8.47 MPa), a tensile modulus (at 300% elongation) of 1340 psi (9.23 MPa), an ultimate tensile strength of 5610 psi (38.65 MPa), and an elongation at break of 710%. In addition, the polyurethane matrix material when dry has a Shore A hardness of about 92, when measured after recrystallizing at room temperature for 60 minutes. The resin content in the aqueous dispersion was 40% by weight.

When dry, the matrix resin also comprised about 16 percent by weight of the resulting composite.

The crystallinity of a sample of U53 resin dried in air was determined by both XRD and DSC analysis.

For the XRD analysis, XRD patterns of the resin were determined using a Philips PW3710 diffractometer with parafocus geometry using Cu Kα radiation. The diffraction pattern was peak fitted from 10° to 30° with the SHADOW program using 5 crystalline peaks and 1 amorphous peak. The percent crystallinity was calculated using the sum of the crystalline peaks area divided by the total net scattering. The percent crystallinity (crystalline index) was found to be 44%.

For the DSC analysis, specimens (5 mg) of the U53 dried resin were prepared using a cut/no-crimp method and PE A1 pans and analyzed in a flowing nitrogen atmosphere using a Seiko RDC 220 DSC. The specimens were heated from room temperature to 195° C. at 20° C./min, cooled to about −140° C. at 10 C/min and then reheated to 200° C. at 10° C./min. The crystallinity was determined to be between 36 and 39%.

Panels of this material were also tested for their ballistic performance using the same type of projectiles as in Example 1. The results are also indicated in Table 1, below.

TABLE 1

| Example | Panel Weight, psf (kg/m²) | M80 Ball, V50, fps (mps) | SEAT, Jm²/kg |
|---|---|---|---|
| 1* | 3.5 (17.2 kg/m²) | 2750 (838.7) | 198 |
| 2* | 3.5 (17.2 kg/m²) | 2563 (781.7) | 172 |
| 3 | 3.5 (17.2 kg/m²) | 2795 (852.4) | 204 |

*comparative example

It can be seen that composites in which the matrix resin is a semi-crystalline polyurethane has significantly improved ballistic properties with an M80 ball projectile (which is a deformable high energy rifle bullet) over composites formed from a previously employed polyurethane matrix resin, and also has improved ballistic properties with an M80 bullet over composites formed from previously employed styrene-isoprene-styrene matrix resin. The crystalline, high modulus high hardness resin provides the highest ballistic resistance.

It is noted that Example 4 of the aforementioned in U.S. Pat. No. 5,690,526 provides similar ballistic data using Dispercoll U 42 resin, which is described in said patent as having a tensile modulus (100% elongation) of 220 psi and a tensile modulus (300% elongation) of 410 psi. The average areal density of the three panels tested in Example 4 is 3.88 psf (compared to 3.5 psf in Example 3 above). The reported data in Example 4 of such patent (using the same type of projectile) had, a V50 of 2837 ft/sec. The equates to a SEAT of 190 in comparison to the higher SEAT of 204 in Example 3 above. SEAT is calculated as $C \times (V50/1000)^2$/areal density, where V50 is measured in fps, the areal density is measured in psf, and C is a constant equal to 0.61×mass of projectile in grains. For the M80 ball, C equals 91.5. Example 5 of such patent also reports test results for a much higher areal density panel (average of 4.87 psf). Thus, it can be seen that the use of semi-crystalline polyurethane resins as per the present invention provide improved ballistic performance as compared with amorphous polyurethane resins.

The U42 resin is described by its manufacturer as an amorphous resin, in contrast to the description in the aforementioned published application WO 2000/29468. The crystallinity of the U42 polyurethane resin was also determined from a sample of the resin dried in air. XRD analysis using the diffractometer used in Example 3 determined that the U42 resins was amorphous (basically 0% crystallinity), without any crystalline peaks. DSC analysis confirmed that the U42 polyurethane resin was amorphous. Thus, contrary to what is stated in the published application the U42 resin is in fact an amorphous resin.

Example 4 (Comparative)

Example 1 was repeated and panels having a weight of 3.6 pounds per square foot (17.6 kg/m²) were tested for ballistic performance against an AK-47 bullet (7.62×39 mm). The results are shown in Table 2, below.

Example 5 (Comparative)

Example 2 was repeated and panels having a weight of 3.6 pounds per square foot (17.6 kg/m²) were tested for ballistic performance against an AK-47 bullet (7.62×39 mm). The results are shown in Table 2, below.

Example 6

Example 3 was repeated and panels having a weight of 3.6 pounds per square foot (17.6 kg/m²) were tested for ballistic performance against an AK-47 bullet (7.62×39 mm). The results are shown in Table 2, below.

TABLE 2

| Example | Panel Weight, psf (kg/m²) | AK 47 bullet, V50, fps (mps) |
|---|---|---|
| 4* | 3.6 (17.6 kg/m²) | 2308 (703.9) |
| 5* | 3.6 (17.6 kg/m²) | 1911 (582.8) |
| 6 | 3.6 (17.6 kg/m²) | 2468 (752.7) |

*comparative example

It can be seen that composites in which the matrix resin is a semi-crystalline polyurethane has significantly improved ballistic properties with an AK 47 bullet (which is a high energy projectile with a mild steel armor penetrator in a deformable skin) over composites formed from a previously employed polyurethane matrix resin, and composites formed from previously employed styrene-isoprene-styrene matrix resin.

Example 7 (Comparative)

Example 1 was repeated and panels having a weight of 4.0 pounds per square foot (19.6 kg/m²) were tested for ballistic performance against a Russian Dragnov bullet (7.62×54R mm). The results are shown in Table 3, below.

Example 8 (Comparative)

Example 2 was repeated and panels having a weight of 4.0 pounds per square foot (19.6 kg/m²) were tested for ballistic performance against a Russian Dragnov bullet (7.62×54R mm). The results are shown in Table 3, below.

Example 9

Example 3 was repeated and panels having a weight of 4.0 pounds per square foot (19.6 kg/m²) were tested for ballistic performance against a Russian Dragnov (7.62×54R mm). The results are shown in Table 3, below.

TABLE 3

| Example | Panel Weight, psf (kg/m²) | Russian Dragnov bullet, V50, fps (mps) |
|---|---|---|
| 7* | 4.0 (19.6 kg/m²) | 2328 (710.0) |
| 8* | 4.0 (19.6 kg/m²) | 2109 (643.2) |
| 9 | 4.0 (19.6 kg/m²) | 2457 (749.3) |

*comparative example

It can be seen that composites in which the matrix resin is a semi-crystalline polyurethane has significantly improved ballistic properties with against the high energy Russian Dragnov bullet projectile (which has a mild steel penetrator in a deformable outer skill) over composites formed from a previously employed polyurethane matrix resin, and composites formed from previously employed styrene-isoprene-styrene matrix resin.

Example 10

Example 3 is repeated using as the polyurethane resin Dispercoll® U 54 from Bayer. This resin is characterized as a crystalline polyurethane and has the following properties: a tensile modulus (at 100% elongation) of 1140 psi (7.85 MPa), a tensile modulus (at 300% elongation) of 1150 psi (7.92 MPa), an ultimate tensile strength of 5610 psi (38.52 MPa), and an elongation at break of 820%. In addition, the polyurethane matrix material when dry has a Shore A hardness of about 95 when measured after recrystallizing at room temperature for 60 minutes. The polyurethane was in the form of an aqueous dispersion which has a solids content of about 50% by weight, with the balance being water. When panels are tested for ballistic performance, similar results are noted.

Example 11

Example 3 is repeated using as the polyurethane resin Dispercoll® U 56 from Bayer. This resin is characterized by its manufacturer as a crystalline polyurethane and has the following properties: a tensile modulus (at 100% elongation) of 1140 psi (7.85 MPa), a tensile modulus (at 300% elongation) of 1140 psi (7.85 MPa), an ultimate tensile strength of 4060 psi (27.97 MPa), and an elongation at break of 860%. In addition, the polyurethane matrix material when dry has a Shore A hardness of about 95, when measured after recrystallizing at room temperature for 60 minutes. The polyurethane was in the form of an aqueous dispersion which has a solids content of about 50% by weight, with the balance being water. When panels are tested for ballistic performance, similar results are noted.

The present invention thus provides ballistic resistant composite materials that are especially useful in hard armor applications. The presence of a semi-crystalline polyurethane matrix resin coated from an aqueous dispersion provides enhanced ballistic properties against several types of projectiles. The thermoplastic polyurethane resins used herein provide the requisite stiffness so that they can be effectively employed in hard armor to provide the desired protection from various projectile threats. It can be seen that the composites of the invention provide articles which have excellent stopping power against projectiles, including those that have steel penetrators embedded therein.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A ballistic resistant composite material useful in rigid armor applications, said composite material comprising at least one consolidated network of high tenacity fibers in a thermoplastic matrix material, said thermoplastic matrix material comprising a thermoplastic polyurethane resin that is semi-crystalline at room temperature, said high tenacity fibers having a tenacity of at least about 7 g/d, wherein prior to consolidation said matrix material comprises said polyurethane resin in an aqueous medium, said polyurethane matrix material when dry having a tensile modulus (at 100% elongation) of at is least about 500 psi (3.45 MPa), a tensile modulus (at 300% elongation) of at least about 500 psi (3.45 MPa), and, an ultimate tensile strength of at least about 2000 psi (13.78 MPa).

2. The ballistic resistant composite material of claim 1 wherein said composite comprises a plurality of said consolidated networks of said high strength fibers.

3. The ballistic resistant composite material of claim 1 wherein said polyurethane matrix material when dry has a tensile modulus (at 100% elongation) of at least about 1000 psi (6.89 MPa), a tensile modulus (at 300% elongation) of at least about 1000 psi (6.89 MPa), and an ultimate tensile strength of at least about 4000 psi (27.56 MPa).

4. The ballistic resistant composite material of claim 1 wherein said polyurethane matrix material when dry has a tensile modulus (at 100% elongation) of at least about 1100 psi (7.58 MPa), a tensile modulus (at 300% elongation) of at least about 1100 psi (7.58 MPa) and an ultimate tensile strength of at least about 5000 psi (34.45 MPa).

5. The ballistic resistant composite material of claim 1 wherein said polyurethane matrix material when dry has a tensile modulus (at 100% elongation) of at least about 1200 psi (8.27 MPa), a tensile modulus (at 300% elongation) of at least about 1200 psi (8.27 MPa), and an ultimate tensile strength of at least about 5500 psi (37.90 MPa).

6. The ballistic resistant composite material of claim 1 wherein said polyurethane matrix material when dry has an elongation-to-break of at least about 600%.

7. The ballistic resistant composite material of claim 1 wherein said polyurethane matrix material when dry has a Shore A hardness of at least about 60, when measured after recrystallizing at room temperature for 60 minutes.

8. The ballistic resistant composite material of claim 1 wherein polyurethane matrix material when dry has a Shore A hardness of at least about 80, when measured after recrystallizing at room temperature for 60 minutes.

9. The ballistic resistant composite material of claim 1 wherein said network of high tenacity fibers comprises a non-woven fabric.

10. The ballistic resistant composite material of claim 1 wherein said non-woven fabric comprises a unidirectionally oriented non-woven fabric.

11. The ballistic resistant composite material of claim 1 wherein said network of high tenacity fibers comprises a woven fabric.

12. The ballistic resistant composite material of claim 1 wherein after formation said polyurethane resin is present in an amount of from about 10 to about 25 weight percent based on the weight of said composite.

13. The ballistic resistant composite material of claim 1 wherein said high tenacity fibers are selected from the group consisting of polyolefin fibers, aramid fibers, polybenzazole fibers, polyvinyl alcohol fibers, polyacrylonitrile fibers, liquid crystal copolyester fibers, polyamide fibers, polyester fibers, glass fibers, graphite fibers, carbon fibers, basalt or other mineral fibers, rigid rod polymer fibers, and blends thereof.

14. The ballistic resistant composite material of claim 1 wherein said high tenacity fibers are selected from the group consisting of high tenacity polyethylene fibers, aramid fibers, PBO fibers, graphite fibers, and blends thereof.

15. The ballistic resistant composite material of claim 1 wherein said high tenacity fibers comprise high tenacity polyethylene fibers and/or aramid fibers.

16. The ballistic resistant composite material of claim 2 wherein adjacent layers of said consolidated networks of fibers are arranged at an angle with respect to each other.

17. The ballistic resistant composite material of claim 2 wherein said plurality of consolidated networks comprises a two ply structure of said consolidated networks.

18. The ballistic resistant composite material of claim 2 wherein said plurality of consolidated networks comprise a four ply structure of said consolidated networks.

19. The ballistic resistant composite material of claim 1 wherein said consolidated material comprises from about 10 to about 60 layers of said consolidated network of fibers.

20. The ballistic resistant composite material of claim 1 wherein prior to consolidation said matrix material comprises an aqueous dispersion of said polyurethane resin.

21. The ballistic resistant composite material of claim 1 wherein said polyurethane matrix material when dry has a crystallinity of at least about 30%.

22. A vehicle protection plate formed from the composite of claim 1.

23. A preimpregnated element useful in forming rigid armor articles, said preimpregnated element comprising at least two consolidated adjacent layers of a network of high tenacity fibers in a thermoplastic matrix material comprising a thermoplastic polyurethane resin that is semi-crystalline at room temperature, said high tenacity fibers having a tenacity of at least about 7 g/d, wherein prior to consolidation said matrix material comprises said polyurethane resin in an aqueous medium, said polyurethane matrix material when dry having a tensile modulus (at 100% elongation) of at least about 500 psi (3.45 MPa), a tensile modulus (at 300% elongation) of at least about 500 psi (3.45 MPa), and an ultimate tensile strength of at least about 2000 psi (13.78 MPa).

24. The preimpregnated element of claim 23 wherein said polyurethane matrix material when dry having a tensile modulus (at 100% elongation) of at least about 1000 psi (6.89 MPa), a tensile modulus (at 300% elongation) of at least about 1000 psi (6.89 MPa), and an ultimate tensile strength of at least about 4000 psi (27.56 MPa).

25. A ballistic resistant composite material useful in rigid armor applications, said article comprising at least one consolidated network of high tenacity fibers in a thermoplastic matrix material, said thermoplastic matrix material comprising a thermoplastic polyurethane resin that is semi-crystalline at room temperature, said high tenacity fibers comprising high tenacity polyethylene fibers, said network of high tenacity fibers comprising a unidirectionally oriented non-woven fabric, wherein prior to consolidation said matrix material comprises said polyurethane resin in an aqueous medium, said polyurethane matrix material when dry having a tensile modulus (at 100% elongation) of at least about 1000 psi (6.89 MPa), a tensile modulus (at 300% elongation) of at least about 1000 psi (6.89 MPa), an ultimate tensile strength of at least about 4000 psi (27.56 MPa), and a Shore A hardness of at least about 60 when measured after recrystallizing at room temperature for 60 minutes.

26. A method of forming a ballistic resistant composite material useful in rigid armor applications, said method comprising:
providing at least one network of high tenacity fibers, said high tenacity fibers having a tenacity of at least about 7 g/d;
applying to said network of high tenacity fibers a thermoplastic polyurethane resin matrix material in an aqueous medium, said polyurethane resin matrix material being semi-crystalline at room temperature, said polyurethane resin matrix material when dry having a tensile modulus (at 100% elongation) of at least about 500 psi (3.45 MPa), a tensile modulus (at 300% elongation) of at least about 500 psi (3.45 MPa), and an ultimate tensile strength of at least about 2000 psi (13.78 MPa); and
consolidating the resulting combination of said network of high tenacity fibers and said thermoplastic polyurethane matrix resin.

27. The method of claim 26 wherein said network of high tenacity fibers comprises a non-woven fabric.

28. The method of claim 27 further comprising providing a plurality of networks of said high tenacity fibers, and arranging said networks of fibers at an angle with respect to each other.

29. The method of claim 28 wherein said non-woven fabric comprises a unidirectionally oriented non-woven fabric and said high tenacity fibers comprise high tenacity polyethylene fibers and/or aramid fibers.

30. A method of improving the ballistic resistance of a ballistic resistant composite material comprising a consolidated network of high tenacity fibers in a thermoplastic polyurethane matrix material, said high tenacity fibers having a tenacity of at least about 7 g/d, said method comprising:
utilizing as said thermoplastic polyurethane matrix material a thermoplastic polyurethane resin matrix material in an aqueous medium, said thermoplastic polyurethane resin matrix material being semi-crystalline at room temperature, said thermoplastic polyurethane matrix material when dry having a tensile modulus (at 100% elongation) of at least about 500 psi (3.45 MPa), a tensile modulus (at 300% elongation) of at least about 500 psi (3.45 to MPa), and an ultimate tensile strength of at least about 2000 psi (13.78 MPa).

31. The method of claim 30 wherein said polyurethane matrix material when dry has a Shore A hardness of at least about 60, when measured after recrystallizing at room temperature for 60 minutes.

* * * * *